United States Patent [19]

Nordstrom

[11] Patent Number: 5,711,826
[45] Date of Patent: Jan. 27, 1998

[54] FUNCTIONALLY GRADIENT CLADDING FOR NUCLEAR FUEL RODS

[75] Inventor: Neal C. Nordstrom, Poway, Calif.

[73] Assignee: CRS Holdings, Inc., Wilmington, Del.

[21] Appl. No.: 631,374

[22] Filed: Apr. 12, 1996

[51] Int. Cl.$^6$ ............................................. G21C 3/07
[52] U.S. Cl. ........................ 148/519; 148/527; 376/416
[58] Field of Search ............................. 148/514, 519, 148/520, 521, 527, 534; 376/416

[56] References Cited

U.S. PATENT DOCUMENTS

| | | | |
|---|---|---|---|
| 2,813,073 | 11/1957 | Saller et al. | 376/457 |
| 3,826,301 | 7/1974 | Brooks | 164/46 |
| 3,909,921 | 10/1975 | Brooks | 164/46 |
| 4,076,888 | 2/1978 | Perugini et al. | 428/313 |
| 4,157,923 | 6/1979 | Yen et al. | 148/512 |
| 4,372,817 | 2/1983 | Armijo et al. | 376/417 |
| 4,390,497 | 6/1983 | Rosenbaum et al. | 376/417 |
| 4,544,523 | 10/1985 | McCollough et al. | 148/514 |
| 4,675,153 | 6/1987 | Boyle et al. | 376/416 |
| 4,735,768 | 4/1988 | Stehle et al. | 376/417 |
| 4,824,634 | 4/1989 | Fuhrman et al. | 376/419 |
| 4,839,239 | 6/1989 | Ducos et al. | 428/623 |
| 4,844,943 | 7/1989 | Chassagneux et al. | 428/632 |
| 4,863,679 | 9/1989 | Imahashi et al. | 376/417 |
| 4,865,652 | 9/1989 | Megusar et al. | 148/325 |
| 4,964,967 | 10/1990 | Hashimoto et al. | 428/687 |
| 5,023,048 | 6/1991 | Mardon et al. | 376/416 |
| 5,024,809 | 6/1991 | Taylor | 376/417 |
| 5,026,516 | 6/1991 | Taylor | 376/416 |
| 5,032,469 | 7/1991 | Merz et al. | 428/662 |
| 5,245,645 | 9/1993 | Steinberg | 376/457 |
| 5,280,504 | 1/1994 | Young | 376/457 |
| 5,338,577 | 8/1994 | Burdette, II | 427/453 |
| 5,373,541 | 12/1994 | Mardon et al. | 376/457 |
| 5,436,947 | 7/1995 | Taylor | 376/416 |
| 5,437,747 | 8/1995 | Adamson et al. | 148/519 |
| 5,472,038 | 12/1995 | Forrest et al. | 164/46 |
| 5,519,748 | 5/1996 | Adamson et al. | 148/519 |

FOREIGN PATENT DOCUMENTS

| | | | |
|---|---|---|---|
| 94/15343 | 7/1994 | WIPO | 148/527 |

OTHER PUBLICATIONS

G.J. McManus, "Spray forming may yield composite success", *Iron Age*, Feb. 1992, pp. 20–22.

P. Walker, "Powder metal tech for Swedish plant", *AMM*, (undated).

*Primary Examiner*—George Wyszomierski
*Attorney, Agent, or Firm*—Dann, Dorfman, Herrell and Skillman, P.C.

[57] ABSTRACT

A process for making a cladding for a nuclear fuel rod is disclosed which includes the following steps. First, at least two layers of zirconium-based metals are spray deposited on a generally cylindrical substrate in a manner that provides a rough, cylindrically-shaped, porous billet. The zirconium-based metal for each layer is different from an adjacent layer and is selected to provide a desired combination of properties. Next, the substrate is removed from the spray deposited material, thereby providing an elongated tube hollow. The spray deposited material is then consolidated in a known manner to remove the porosity, densify the tube hollow to substantially full density, and reduce the cross-sectional dimension of the tube hollow to a desired size. In a further step the consolidated tube hollow is annealed under conditions of time and temperature selected to relieve stresses imposed on the tube hollow during the consolidation step and to provide a desired combination of properties in the densified zirconium-based metal layers.

19 Claims, 2 Drawing Sheets

FUNCTIONALLY GRADIENT CLADDING FOR NUCLEAR FUEL RODS

FIELD OF THE INVENTION

This invention relates to fuel rods for nuclear reactors and in particular to a process for manufacturing cladding for such fuel rods.

BACKGROUND OF THE INVENTION

Fuel rods for nuclear reactors are currently manufactured in two basic forms. The first, used for both boiling water reactors (BWR) and pressurized water reactors (PWR), has a single alloy tube cladding made of either Zircaloy-2 alloy or Zircaloy-4 alloy. The second type is a bimetallic tube used only in BWR's. This second type has a cladding that includes an inner liner made of pure zirconium or a low-tin, zirconium alloy with an outer layer of Zircaloy-2.

A fuel rod with an inner liner is referred to as a barrier rod. The basic purpose of the "barrier" is to provide a soft layer of pure or essentially pure zirconium into which the nuclear fuel pellet can swell. That arrangement protects the harder and more brittle Zircaloy outer shell from cracking when the nuclear fuel pellets swell during operation of the reactor. The term for cracking that results from the swelling of the fuel pellets is pellet clad interaction (PCI). Cracked fuel rods release fission products into the reactor water system causing higher radiation levels in the vicinity of the piping of the reactor cooling water systems.

Both types of fuel rods are made using the same basic process. The zirconium or zirconium alloy is melted and forged into a billet, and the billet is gun-drilled. The drilled billet is then mechanically worked to final cross-sectional dimension, as by extrusion or tube reduction. If the fuel cladding is to have a "barrier" liner, then the billet of the liner material and the billet of the outer layer material are carefully machined, cleaned and assembled. Then the two billets are extruded together (this step is referred to as co-extrusion) to a rough diameter. The roughly finished form is then tube reduced to final size.

In practice, the co-extrusion technique has several disadvantages. The biggest problem with the process is that the inner liner and the outer shell often do not form a uniform and complete metallurgical bond at their interface. The failure to form a proper metallurgical bond is usually the result of insufficient cleaning prior to assembly or poor fit between the inner and the outer shell.

Another problem with the known preparation techniques is that a significant amount of waste material results because of the gun-drilling operation. Furthermore, a significant amount of time and work is necessary to reduce the zirconium alloy billets to the proper dimensions for a fuel rod.

In view of the foregoing, it would be desirable to have a new method of fabricating nuclear fuel rods that avoid the problems associated with the known techniques.

SUMMARY OF THE INVENTION

The disadvantages associated with the known methods for making nuclear fuel rods are solved to a large degree by the process according to the present invention. The process of this invention includes the following steps. First, a porous preform is produced by spray depositing a first metal layer on a cylindrical substrate. The first metal layer is formed of a soft metal selected from the group consisting of zirconium or a low alloy Zr alloy such as a low-tin zirconium alloy. Here and throughout this specification the term "low alloy zirconium alloy" means an alloy of zirconium containing not more than about 5% of alloying additions. Next, a second metal layer is spray deposited onto the first metal layer. The second metal layer is formed of a zirconium alloy characterized by a desired combination of properties such as high mechanical strength, creep resistance, and/or corrosion resistance.

After the two metal layers have solidified, the cylindrical substrate is removed from the porous preform. The porous preform is then consolidated to substantially full density to form a tube having a desired cross-sectional dimension. The consolidated tube is then heat treated to obtain a desired microstructure in each of the metal layers and to remove any residual stresses in the tube resulting from the consolidation thereof.

BRIEF DESCRIPTION OF THE DRAWINGS

Further objects and advantages of the present invention will become apparent from the following detailed description and the accompanying drawings, of which.

DETAILED DESCRIPTION

Figure 1:
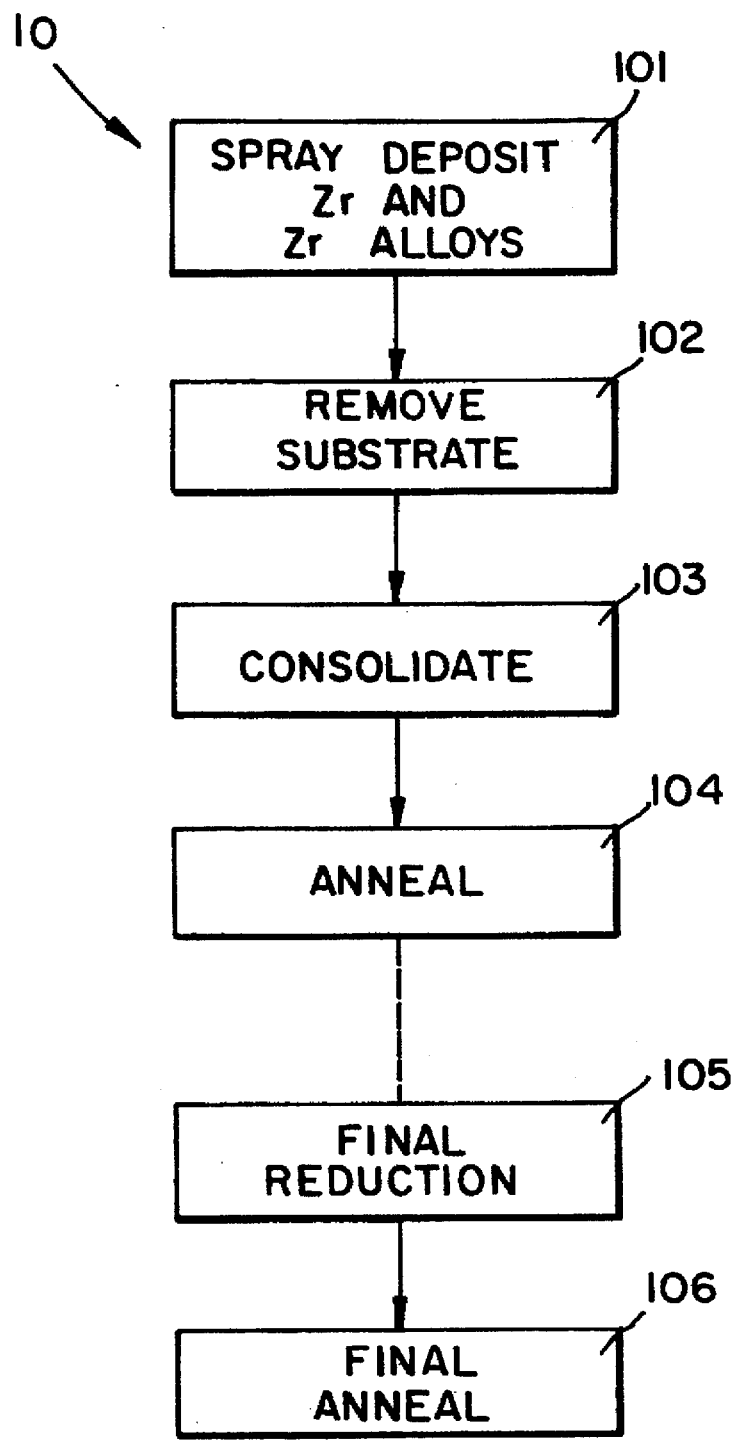
FIG. 1 is a schematic block diagram of a preferred sequence for the process according to the present invention.

Referring now to FIG. 1, the basic steps of the process 10 according to the present invention are shown. In step 101 at least two metallic layers are spray deposited on a generally cylindrical substrate in a manner that provides a rough, cylindrically-shaped billet. In step 102, the substrate is removed from the spray deposited material, thereby leaving a central, longitudinal opening through the billet. The spray deposited material is then consolidated in step 103 in a known manner to remove porosity, densify the spray deposited material, and form a tube hollow.

In step 104 the tube hollow is annealed under conditions of time and temperature selected to relieve stresses and to provide a desired combination of properties in the consolidated metal layers. The annealed tube hollow is then further reduced in step 105 to final dimensions in a manner to provide a fuel cladding having the desired final dimensions. The fuel cladding is then given a final heat treatment in step 106 to assure the desired combination of properties and to relieve any residual stresses from the final reduction operation.

In step 101 of the process according to the present invention, zirconium and/or zirconium alloys are deposited in layers on a bar or tubular substrate of appropriate dimensions. The spray deposition technique utilized is preferably of the type wherein the alloy is melted and, while in the molten state, gas atomized to provide a stream of molten metal which is then directed onto the substrate to form a layer of desired thickness. The preferred method is similar to that described in U.S. Pat. No. 3,826,301, the disclosure of which is incorporated herein by reference. Here and throughout this specification and in the claims, the term "spray deposition" or "spray deposited" refers to the metal deposition technique described above and in the aforesaid patent.

The spray deposition technique results in rapid cooling of the atomized melted. Thus, the spray deposition of the zirconium alloys used in process according to the present invention results in a fine-grained microstructure in the as-cooled and solidified metal. Such a microstructure is highly desirable in zirconium alloys of the type used in nuclear fuel cladding. It will be appreciated by those skilled in the art that the effect on the alloys' microstructures is essentially the same as the beta quench that is usually applied to zirconium alloy fuel cladding.

The zirconium alloys used in the process are chosen to provide a combination of desired properties for improved PCI. In one embodiment of a fuel rod cladding made in accordance with the present invention, zirconium or a soft, low alloy zirconium alloy is spray deposited on the substrate to provide an inner, crack resistant layer. A second layer formed of an alloy having a high degree of creep resistance, high strength, and/or expansion resistance is spray deposited on top of the first layer. Still further, if desired, another zirconium alloy that provides good corrosion resistance can be spray deposited over the creep resistant alloy layer. In this manner, the properties of the fuel cladding can be made to vary across the annular cross-section of the fuel cladding. It is contemplated that other alloys, such as Ti-based alloys, that provide the desired properties and are suitable for use in a nuclear fission reactor can be used in the process of this invention instead of Zr-based alloys.

In carrying out the spray deposition step of this invention, the metal or alloy for each layer is melted and deposited separately from each of the other layers. Alternatively, the batch of molten metal can be continuously re-alloyed so that the spray deposition can be carried out in a continuous manner to provide a continuous gradient in the alloy composition.

Because of the nature of the spray deposition technique, uniform metallurgical bonding between the various layers is assured without the need for meticulous surface cleaning between deposited layers. A continuous gradient of properties is provided across the thickness of the cladding because some interlayer alloying will occur during the deposition step. Moreover, the spray-deposition apparatus and process can be tailored to provide an initial billet that is dimensionally close to the final cladding jacket in order to significantly reduce the amount of mechanical work necessary to reduce the billet to final dimension.

The substrate is removed in step 102 after the desired number of layers of the zirconium alloys have been spray deposited and have solidified on the substrate. A tubular substrate is preferred because it provides a channel for circulating a cooling medium to remove heat, thereby speeding the solidification of the metal as it is deposited. A tubular substrate is also easier to remove and results in less wasted metal than a solid bar substrate. The substrate is removed by machining techniques, such as drilling, or, if appropriate, by chemical techniques, for example, acid removal.

Upon removal of the substrate from the deposited material a rough, porous tube hollow is provided. This rough tube hollow is consolidated and heat treated to form a cladding of appropriate dimension. Depending on the starting size and porosity of the spray deposited material, one or more cycles of consolidation, reduction, and heat treating steps are necessary. It is expected that for most applications a two-stage consolidation, sizing, and heat treatment cycle will be sufficient.

The first consolidation step 103 includes a reduction of the annular cross-section of the roughly formed tube hollow by extrusion, tube drawing, or, preferably, tube reduction. The term "tube reduction" refers to such known processes as Pilger tube reduction. Alternatively, the spray deposited material can be consolidated by hot isostatic pressing, sintering, or other powder metallurgy consolidation techniques known to those skilled in the art.

After the first reduction, the tube hollow is annealed, as in step 104 under time and temperature conditions that are selected to relieve any stresses imposed on the tube hollow during the consolidation process and to provide the desired combination of properties in the zirconium alloys which form the tube hollow. In step 105 the tube hollow is reduced to final cross-sectional dimensions by techniques similar to those described with respect to the first consolidation step. The preferred technique is tube reduction such as by the aforementioned Pilger tube reduction method.

After the final reduction and sizing step, the tube hollow is annealed, step 106, under time and temperature conditions to optimize the desired properties and to relieve any residual stresses from the final tube reduction step. In general, the time, temperature, and cooling parameters for the annealing heat treatment are selected to provide an optimized distribution of small second-phase particles in the zirconium alloys used.

Figure 2:
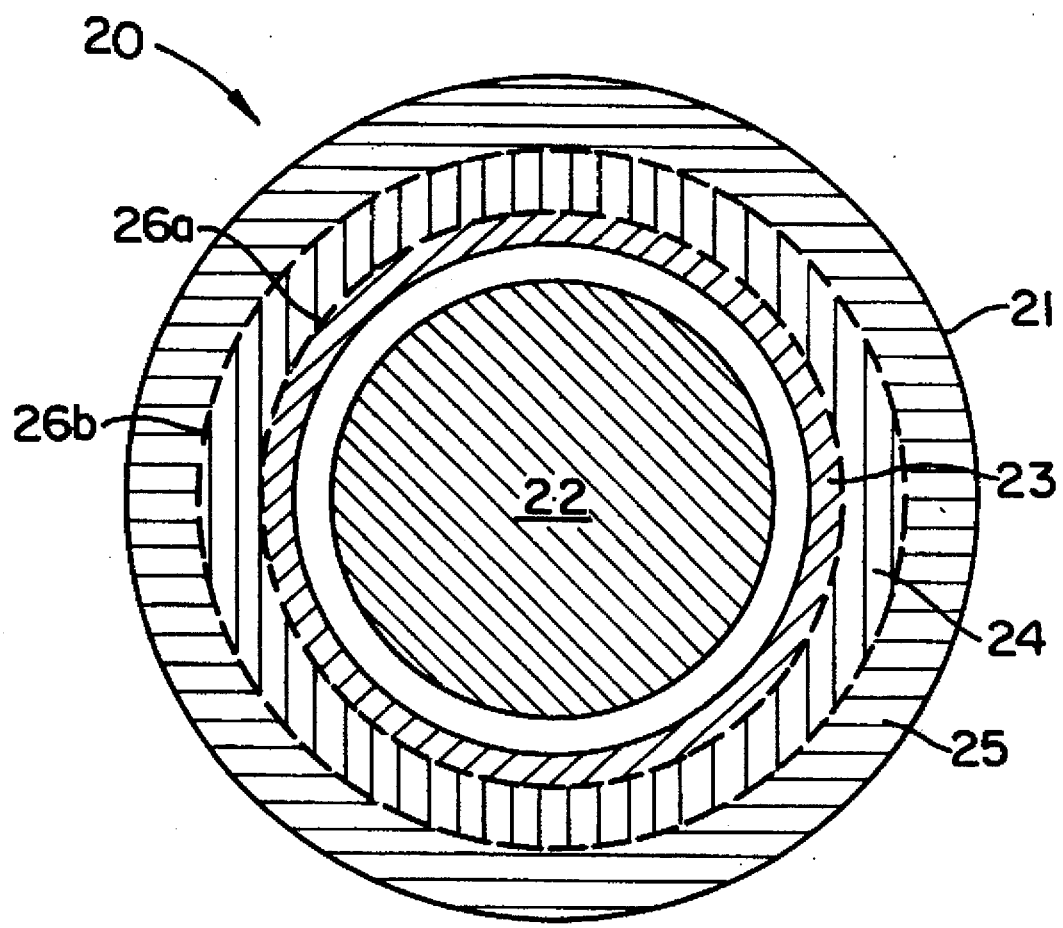
FIG. 2 is transverse cross-sectional view of a nuclear fuel rod formed by the process of the present invention.

The structure of a nuclear fuel rod formed in accordance with the present invention can be better understood by referring now to FIG. 2. A fuel rod 20 has a cladding 21 which surrounds fuel pellets 22. The cladding 21 is composed of three layers: an innermost or "liner" layer 23, an intermediate layer 24, and an outermost or "shell" layer 25. The liner layer 23 is formed of pure zirconium or a relatively soft zirconium alloy, such as a low tin, Zr—Sn alloy. Liner layer 23 is nearest to the nuclear fuel pellets 22 and is capable of deforming without cracking when the fuel pellets swell during operation. The intermediate layer 24 is formed of a creep resistant or high strength zirconium alloy, such as a Zr—O—Fe—Sn alloy. The shell layer 25 is formed of a highly corrosion resistant alloy such as Zircaloy-2 or Zircaloy-4 alloy. It can be appreciated from FIG. 2 that the various alloy layers that constitute the cladding 21 transition gradually into one another to form a substantially continuous gradient of materials and properties. Such a structure is quite different from the known structures which consists of discrete layers that are bonded together mechanically. For this reason, the interfaces between the layers 23, 24, and 25 in the cladding 21 are shown with dashed lines 26a and 26b. Those interfaces are in fact alloy transition zones that result from interalloying of the respective layers as they are spray deposited.

From the foregoing description and the accompanying drawings, it can be seen that the present invention provides certain novel features and advantages that will be apparent to those skilled in the art. More particularly, there has been described a novel process for making a fuel cladding for a nuclear fuel rod in which two or more layers of zirconium or a zirconium alloy are formed on a substrate by the technique known as spray deposition. The use of the spray deposition technique permits a continuous gradation of zirconium alloys, with an accompanying gradation of desired properties, across the wall-thickness of the fuel cladding. The spray deposition of the various metal layers ensures a uniform metallurgical bond between the various layers without the need for meticulous surface cleaning between depositions of the metal layers. Moreover, because of the rapid cooling of the atomized molten metal that is associated with the spray deposition technique, a fine-grained structure results in the deposited metal layers without the need for a separate beta quench. Further still, the use of the spray deposition technique permits the formation of near net-shape billets which require less reduction to final size than billets formed by the conventional cast-and-wrought processes for making nuclear fuel cladding.

The terms and expressions which have been employed herein are used as terms of description, not of limitation. There is no intention in the use of such terms and expressions of excluding any equivalents of the features shown and described or portions thereof. It is recognized that various modifications are possible within the scope of the invention claimed that do not significantly depart from the invention as described and shown herein.

What is claimed is:

1. A process for fabricating a cladding for a nuclear fuel rod, said cladding having a functionally gradient structure and said process comprising the steps of:
   (a) forming a porous preform by
       (1) spray depositing a first metal layer on a cylindrical substrate, said first metal layer being formed of a metal selected from the group consisting of zirconium and low alloy zirconium alloys; and then
       (2) spray depositing a second metal layer onto said first metal layer, said second metal layer being formed of a first zirconium alloy;
   (b) removing the cylindrical substrate from said porous preform after the first and second metal layers have solidified;
   (c) consolidating the porous preform to substantially full density to form a tube having a desired cross-sectional dimension; and then
   (d) heat treating the tube to relieve stresses and to obtain a desired microstructure in each of said first and second metal layers.

2. The process set forth in claim 1 wherein the step of forming the porous preform further comprises the step of spray depositing a third metal layer onto said second metal layer, said third metal layer being formed of a second zirconium alloy different from the first zirconium alloy, said third metal layer being spray deposited before said cylindrical substrate is removed.

3. The process set forth in claim 2 wherein the step of consolidating the porous preform comprises extruding the porous preform to a first cross-sectional dimension.

4. The process set forth in claim 2 wherein the step of consolidating the porous preform comprises tube reducing the porous preform to a first cross-sectional dimension.

5. The process set forth in claim 1 wherein the step of consolidating the porous preform comprises a cycle of reducing the cross-sectional dimensions of the porous preform to an intermediate-size tubular form and then heat treating the intermediate-size tubular form to relieve stresses imposed during said reducing step.

6. The process set forth in claim 5 comprising the steps of terminating the cycle of reducing the cross-sectional dimensions of the porous preform to intermediate sizes and heat treating the intermediate-size tubular forms, and then reducing the intermediate-size tubular to final cross-sectional dimension.

7. The process set forth in claim 1 wherein the step of consolidating the porous preform comprises the steps of
   extruding the porous tubular preform to a first intermediate cross-sectional dimension;
   heat treating the extruded preform to remove residual stresses resulting from said extruding step; and then
   tube reducing the heat treated preform to the desired cross-sectional dimension.

8. The process set forth in claim 1 wherein the step of spray depositing the first metal layer comprises the steps of melting the metal, atomizing the molten metal, and then spraying the atomized metal onto the cylindrical substrate.

9. The process set forth in claim 8 wherein the step of spray depositing the second metal layer comprises the steps of melting the first zirconium alloy, atomizing the molten zirconium alloy, and then spraying the atomized zirconium alloy onto the first metal layer.

10. A process for fabricating a cladding for a nuclear fuel rod, said cladding having a functionally gradient structure and said process comprising the steps of:
    (a) forming a porous preform by spray depositing first and second zirconium-based metals in respective first and second metal layers on a cylindrical substrate,
    (b) removing the cylindrical substrate from said porous preform after the first and second metal layers have solidified;
    (c) consolidating the porous preform to substantially full density to form a tube having a desired cross-sectional dimension; and then
    (d) heat treating the tube to obtain a desired microstructure in each of said first and second metal layers.

11. A process as recited in claim 10 wherein said first zirconium-based metal is a soft metal selected from the group consisting of substantially pure zirconium and low alloy zirconium alloys.

12. A process as recited in claim 11 wherein said second zirconium-based metal is a zirconium alloy characterized by one or more properties selected from the group consisting of mechanical strength, creep resistance, corrosion resistance, and expansion resistance.

13. The process set forth in claim 10 wherein the step of spray depositing the first metal layer comprises the steps of melting the first zirconium-based metal, atomizing the molten metal, spraying the atomized metal onto the cylindrical substrate, and then allowing the deposited metal layer to solidify.

14. The process set forth in claim 13 wherein the step of spray depositing the second metal layer comprises the steps of melting the second zirconium-based metal, atomizing the molten metal, spraying the atomized zirconium metal onto the first metal layer, and then allowing the deposited second metal layer to solidify.

15. The process set forth in claim 10 wherein the step of spray depositing the first and second metal layers consists essentially of the steps of preparing a molten bath of the first zirconium-based metal, atomizing the molten metal, spraying the atomized metal onto the cylindrical substrate, re-alloying said molten bath to form a second molten bath of said second zirconium-based metal, atomizing the molten second zirconium-based metal, spraying the atomized second zirconium-based metal onto the first metal layer, and then allowing the deposited first and second metal layers to solidify.

16. The process set forth in claim 15 comprising the step of continuously realloying the molten bath as the molten metal is atomized and spray deposited.

17. A process for fabricating a cladding for a nuclear fuel rod, said cladding having a functionally gradient structure and said process comprising the steps of:
    (a) forming a porous preform by
        (1) spray depositing a first metal layer on a cylindrical substrate, said first metal layer being formed of a soft metal selected from the group consisting of zirconium and low alloy zirconium alloys; and then
        (2) spray depositing a second metal layer onto said first metal layer, said second metal layer being formed of a first zirconium alloy; and
        (3) spray depositing a third metal layer onto said second metal layer, said third metal layer being formed of a second zirconium alloy;

(b) removing the cylindrical substrate from said porous preform after the first, second, and third metal layers have solidified;

(c) consolidating the porous preform to substantially full density to form a tube having a desired cross-sectional dimension; and then (d) heat treating the tube to obtain a desired microstructure in each of said first and second metal layers.

18. The process set forth in claim 17 wherein the step of consolidating the porous preform comprises the steps of extruding the porous tubular preform to a first intermediate cross-sectional dimension;

heat treating the extruded preform to remove residual stresses resulting from said extruding step; and then tube reducing the heat treated preform to the desired cross-sectional dimension.

19. The process set forth in claim 17 wherein the step of consolidating the porous preform comprises a cycle of reducing the cross-sectional dimensions of the porous preform to an intermediate-size tubular form and then heat treating the intermediate-size tubular form to relieve stresses imposed during said reducing step.

* * * * *